United States Patent
Yeoh et al.

(10) Patent No.: US 10,832,180 B2
(45) Date of Patent: Nov. 10, 2020

(54) ARTIFICIAL INTELLIGENCE SYSTEM THAT EMPLOYS WINDOWED CELLULAR AUTOMATA TO CREATE PLAUSIBLE ALTERNATIVES

(71) Applicant: The Aerospace Corporation, El Segundo, CA (US)

(72) Inventors: Terence Yeoh, Pasadena, CA (US); Nehal Desai, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 107 days.

(21) Appl. No.: 16/166,691

(22) Filed: Oct. 22, 2018

(65) Prior Publication Data

US 2019/0130321 A1    May 2, 2019

Related U.S. Application Data

(63) Continuation-in-part of application No. 15/968,203, filed on May 1, 2018, which is a continuation-in-part of application No. 15/798,020, filed on Oct. 30, 2017.

(51) Int. Cl.
*G06Q 10/04* (2012.01)
*G06F 17/14* (2006.01)
*G06K 9/46* (2006.01)

(52) U.S. Cl.
CPC ......... *G06Q 10/047* (2013.01); *G06F 17/148* (2013.01); *G06K 9/46* (2013.01)

(58) Field of Classification Search
None
See application file for complete search history.

(56) References Cited

U.S. PATENT DOCUMENTS

| | | | |
|---|---|---|---|
| 6,393,154 B1 | 5/2002 | Lafe | |
| 2004/0024724 A1* | 2/2004 | Rubin | G06N 5/025 706/55 |
| 2010/0027895 A1 | 2/2010 | Noguchi et al. | |

OTHER PUBLICATIONS

Mark Roz, "Notice of Allowance", dated May 20, 2020, U.S. Appl. No. 15/968,203.
Mark Roz, "Replacement Restriction Requirement", dated Apr. 10, 2020, U.S. Appl. No. 15/968,203.
Mark Roz, "Restriction Requirement", dated Apr. 3, 2020, U.S. Appl. No. 15/968,203.
RPSContest website available at http://www.rpscontest.com/ (last accessed May 1, 2018).
Mark Roz, "Non-Final Office Action", dated Oct. 10, 2019, U.S. Appl. No. 15/798,020.
Mark Roz, "Notice of Allowance", dated Feb. 11, 2020, U.S. Appl. No. 15/798,020.

* cited by examiner

*Primary Examiner* — Mark Roz
(74) *Attorney, Agent, or Firm* — LeonardPatel PC

(57) ABSTRACT

An artificial intelligence (AI) system is disclosed that employs windowed cellular automata to create plausible alternatives. A cellular automata-based technique may be utilized to perform pattern recognition and assess the best path available (i.e., "instant improv"). Alternative sequences (i.e., "pattern improv") may also be used to determine alternative paths. This instant improv and pattern improv may then be used to create completely new, plausible alternative nodes. The subsequent evaluation of the sentiment further creates new, dynamic capabilities. Through the use of windowed memory learning, recall, and interpolation, new plausible structures are generated that predict dynamic systems.

23 Claims, 11 Drawing Sheets

FIG. 3
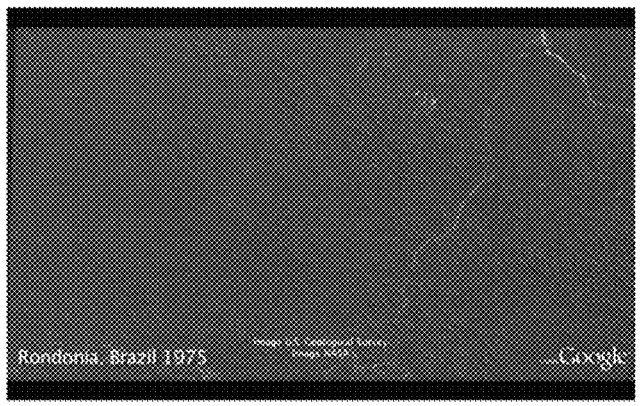
1975
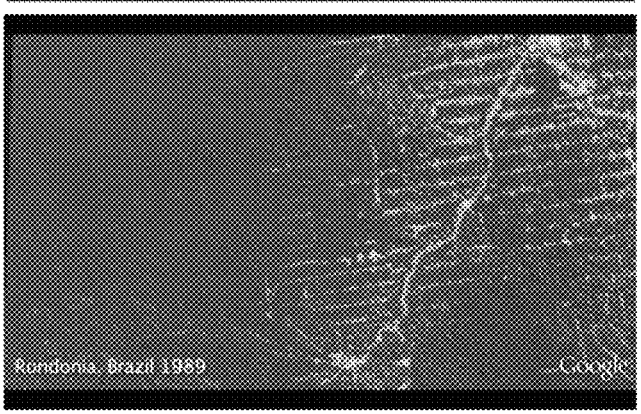
1989
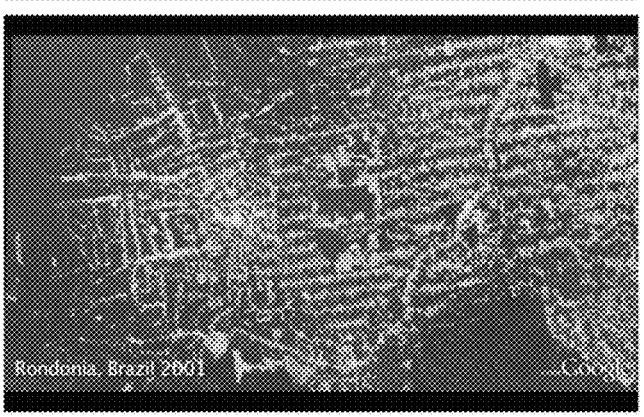
2001
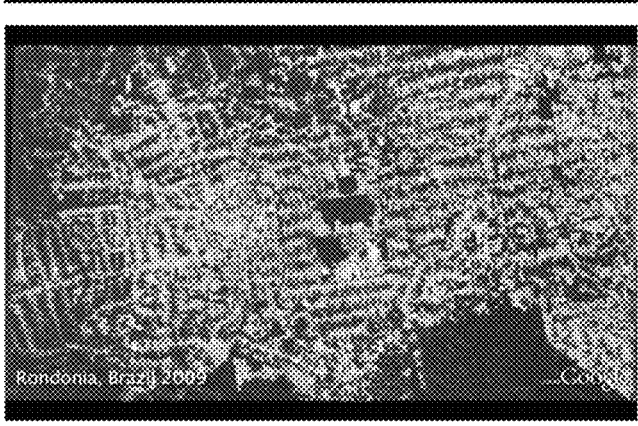
2009

FIG. 7
700
[74,65,43,69,71,40]
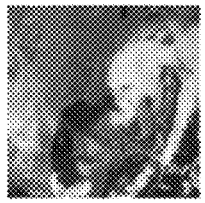
Actual 0007
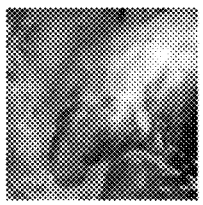 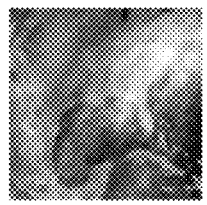 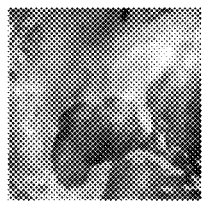 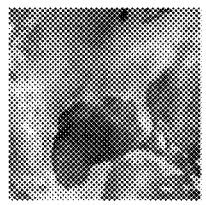 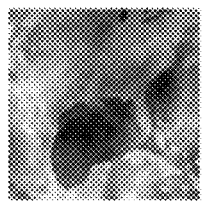
Dreamed transitions 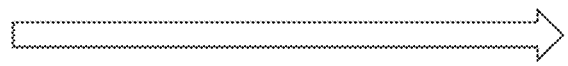
Actual 0098
[31,57,49,32,58,39]

FIG. 8
800
[74,65,43,69,71,40]
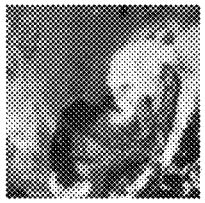
Actual 0007
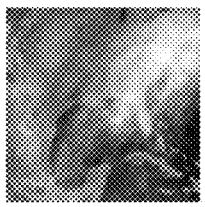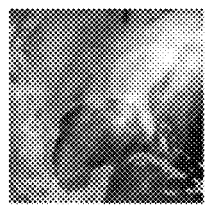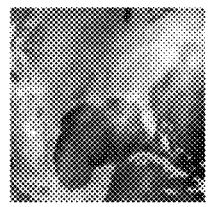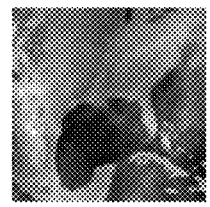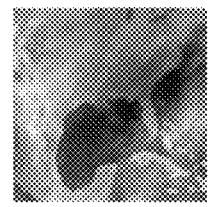
Dreamed transitions 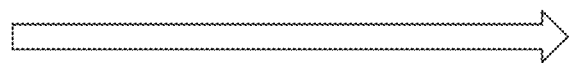
Actual 0098
[31,57,49,32,58,39]

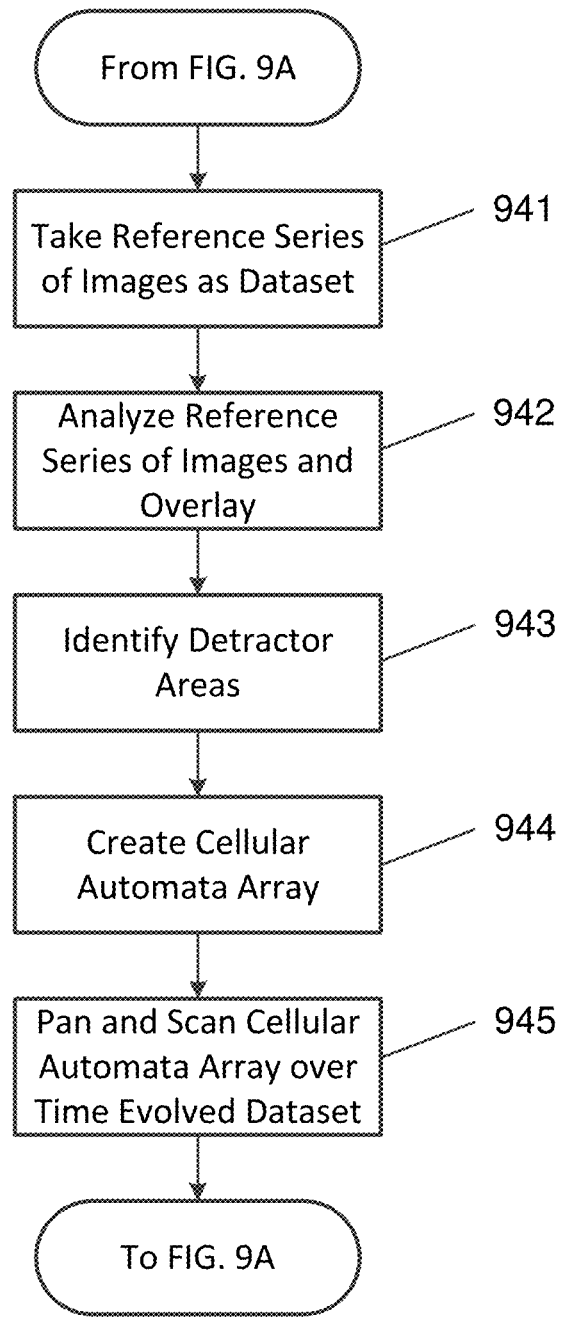

ARTIFICIAL INTELLIGENCE SYSTEM THAT EMPLOYS WINDOWED CELLULAR AUTOMATA TO CREATE PLAUSIBLE ALTERNATIVES

CROSS-REFERENCE TO RELATED APPLICATIONS

This application is a continuation-in-part (CIP) of U.S. Nonprovisional patent application Ser. No. 15/968,203 filed May 1, 2018, which is a CIP of U.S. Nonprovisional patent application Ser. No. 15/798,020 filed Oct. 30, 2017. The subject matter of these earlier filed applications is hereby incorporated by reference in its entirety.

FIELD

The present invention generally pertains to artificial intelligence (AI), and more specifically, to an AI system that employs windowed cellular automata to create plausible alternatives.

BACKGROUND

Current AI systems, whether based on artificial neural networks, deep learning networks, or higher order cognitive systems such as Watson®, operate in a reductionist mode of determination. In other words, these systems seek to derive an answer from the available set of learned or trained information. Deep layer neural networks (DLNNs) utilize standard feedforward and back propagation processes to take information from datasets (usually visual) and classify the information in a set of predefined bins utilizing both unsupervised and supervised learning.

However, DLNN systems are so complex that it is not apparent what details in the data are being used to classify the image, and subtle changes in data values can drastically change the classification. The current state of the art utilizes these deep learning algorithms, which are black box algorithms with little insight into the internal states of the AI system, and seeks to enclose a dynamic and ever-changing environment through massive data assimilation and learning. This reductionist "black box" approach also does not enable new or creative datasets to be developed based on prior datasets. In a system where the rules continually change, such an approach may not work effectively beyond application to finite games, such as chess and go. There is no known algorithm that generates alternative data that is plausible for use in simulation and prediction of future states. Indeed, these techniques do not map disallowed states, and also do not explore plausible, but currently nonexistent, alternatives. This strict adherence to rules makes current AI approaches suboptimal, or even dangerous, for certain applications. Accordingly, an improved approach may be beneficial.

SUMMARY

Certain embodiments of the present invention may be implemented and provide solutions to the problems and needs in the art that have not yet been fully solved by conventional AI technologies. For example, some embodiments of the present invention pertain to an AI system employing windowed cellular automata to create plausible alternatives.

In an embodiment, a computer program is embodied on a non-transitory computer-readable medium. The program is configured to cause at least one processor to perform pattern recognition to determine a best available path from a plurality of nodes representing choices. The plurality of nodes are encoded into a cellular automata array and include a unique identifier (UID). The program is also configured to cause the at least one processor to traverse the best available path and look for alternative paths within a predetermined distance from a current UID that present alternative path choices. The alternative path choices are not directly reachable via the best available path. The program is further configured to cause the at least one processor to generate at least one new alternative node that is closer to at least one more beneficial node of at least one of the alternative paths, jump from the determined best path available to an alternative path via the generated at least one new alternative node, and provide a solution by following the alternative path to which the program jumped to a conclusion of the alternative path.

In another embodiment, a computer-implemented method includes generating, by a computing system, a new alternative node. The new alternative node is between a first node of a current path and a second node of an alternative path. The first node the second node have respective UIDs. The first node and the second node are proximate to one another within a predetermined distance based on the respective UIDs. The computer-implemented method also includes jumping, by the computing system, from the first node to the second node via the generated new alternative node and providing a solution, by the computing system, by following the alternative path to which the program jumped to a conclusion of the alternative path.

In yet another embodiment, a computer-implemented method includes taking a reference series of images as a dataset, by a computing system, and analyzing the reference series of images, by the computing system, to determine a relative size of branching points and resource areas by taking a first image of the reference series of images and overlaying the resource areas to a progression of branches to predict future patterns. The computer-implemented method also includes identifying detractor areas, by the computing system, and creating a cellular automata array sized to take the branching points, resource areas, and detractor areas into account, by the computing system. The computer-implemented method further includes panning and scanning the cellular automata array over a time evolved dataset, by the computing system, to train individual cellular automata to be sensitive to the branching points, resource areas, and detractor areas. Additionally, the computer-implemented method includes producing a new image, by the computing system, based on the training.

In still another embodiment, a computer-implemented method includes generating, by a computing system, a new alternative node. The new alternative node is between a first node of a current path and a second node of an alternative path. The first node the second node have respective UIDs. The first node and the second node are proximate to one another within a predetermined distance based on the respective UIDs. The computer-implemented method also includes using inverse principal component analysis (PCA) and an inverse wavelet transform (WLT), or inverse PCA and an inverse discrete cosine transform (DCT), by the computing system, from an average of UIDs of the first node and the second node used to create the new alternative node to derive original wavelet or cosine eigenvalues. The computer-implemented method further includes recreating an image, by the computing system, using an inverse of the eigenvalues, thereby melding information between the artificially created new alternative node, the first node, and the second node.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a progression of four Google™ historical images illustrating deforestation in the Brazilian Amazon state of Rondonia.

FIG. 7 illustrates an example of using inverse PCA and an inverse discrete cosine transform (DCT) on a satellite image to predict future cloud patterns, according to an embodiment of the present invention.

FIG. 8 illustrates an example of using inverse PCA and an inverse wavelet transform (WLT) on the satellite image to predict future cloud patterns, according to an embodiment of the present invention.

FIG. 9B is a flowchart illustrating a sliding window subprocess of FIG. 9A, according to an embodiment of the present invention.

DETAILED DESCRIPTION OF THE EMBODIMENTS

Some embodiments of the present invention pertain to an AI system that employs windowed cellular automata to create plausible alternatives. Some embodiments utilize a cellular automata-based technique to perform pattern recognition and assess the best path available (i.e., "instant improv"), such as that described in U.S. Nonprovisional patent application Ser. No. 15/798,020. More specifically, detailed memory storage of data (e.g., image data) may enable recall of the data created instances of amalgamated images and what is plausible. Some embodiments also use alternative sequences (i.e., "pattern improv") to determine alternative paths, such as those described in U.S. Nonprovisional patent application Ser. No. 15/968,203. Some embodiments may then use this instant improv and pattern improv to create completely new, plausible alternative nodes. The subsequent evaluation of the sentiment further creates new, dynamic capabilities. Through the use of windowed memory learning, recall, and interpolation, new plausible structures are generated that predict dynamic systems.

Some embodiments have the advantage of considering not just the most probable answer, but also less likely alternatives and new alternatives altogether, which may include a preferable answer than the most likely one. This differs from conventional AI techniques, which completely map out the possible decision space and provide the "best" (i.e., the most probable) answer based on a rigid set of rules. Some embodiments achieve this, in part, by creating new alternatives previously not yet seen while still having some basis in reality. This consideration of low probability scenarios provides the system with the ability to create and imagine, which provides a creative learning process rather than a reductionist process, as in conventional techniques. The solutions provided by such a system enable higher order operations not currently achievable with the current reductionist approaches.

Figure 1:
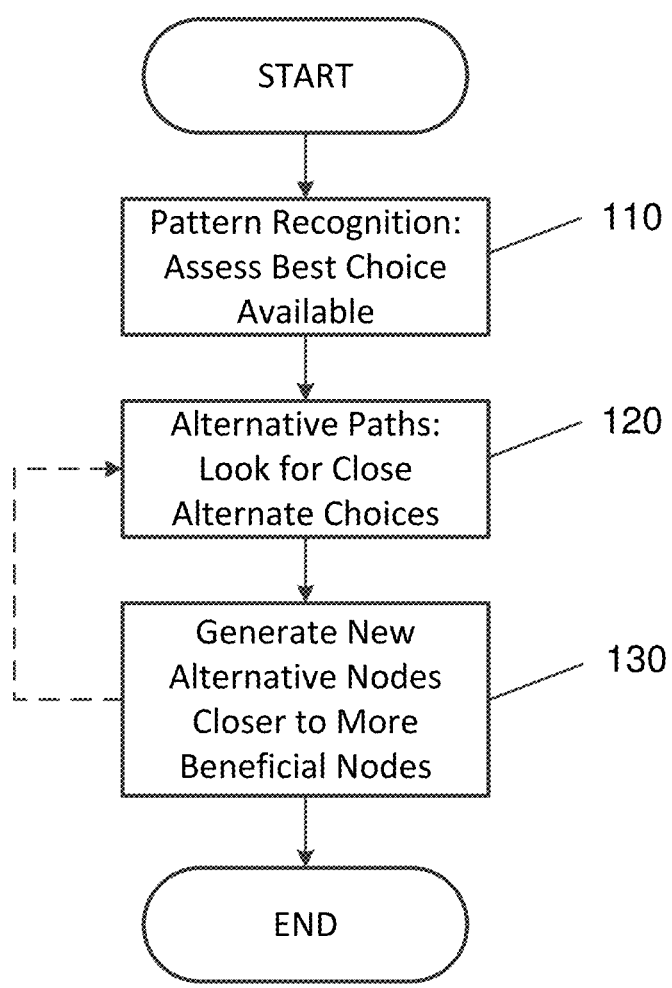
FIG. 1 is a flowchart illustrating a process for performing pattern recognition, determining alternative paths, and calculating new, alternative nodes closer to more beneficial nodes, according to an embodiment of the present invention.

In order to create new, plausible alternatives, some embodiments infer new nodes from existing nodes. In other words, rather than only generating new paths, some embodiments generate entirely new nodes. This inference of a new node may be performed, for example, when two nodes are too distant from one another within the constraints of the algorithm to "jump" from one path to another. Actual alternate nodes are created that are more favorable. In some embodiments, a three-step process is employed to perform pattern recognition and assess the best choice available, find alternative paths that are near a current unique ID (UID), and create new, plausible alternative nodes that are closer to more beneficial nodes. Such a process 100 is generally shown in FIG. 1.

Programmable Cellular Automata for Memory Search, Recall, Simulation, and Improvisation A cellular automata-based technique for detailed memory storage may first be employed that allows imperfect recall to perform pattern recognition and assess the best choice available (i.e., "instant improv"). Information is encoded into a cellular automata memory structure at 110 such that it can be recalled utilizing unique memory anchors (engrams, also called UIDs herein) in a manner that both identifies and relates each piece of information relative to other data points. These automata may be individually programmable with a limited, local ruleset that activates other cellular automata based on prior patterns that were fed into an array thereof.

The frame sequence is fed into the system twice in some embodiments such that the pattern is self-regenerating and repeating. A limited number of connections between neurons and forgetting of rare data points enables memory consolidation. Limiting the number of connections or codependent rules between cellular automata cells enables consolidation of ideas and imperfect recall.

Once the sequences have been learned and a pattern is locked in, the system is in a recall phase. The predictions are utilized as the actual activated neurons, and that data is used to predict the next frame. More specifically, the predicted frame is inserted into the actual frame, and data in the frame can be recovered and reconstructed.

In some embodiments, in order to keep memory recall "locked" during frames with little or no data for pattern recall and image reconstruction, a unique hash generated from a UID is utilized. For instance, in certain embodiments, wavelet decomposition and a discrete cosine transform (DCT) are used as feeds into a principal component analysis (PCA) to create a unique hash of bins of six numbers from 1-100 that is used to identify the image in question relative to other images. The number 0 is avoided in some embodiments because this may indicate that any frame is possible.

Multiple datasets are fed into the cellular automata array in some embodiments, enabling a multitude of possible outcomes within the array and imperfect recall. Individual memories can be added by learning the first memory sequence, then inserting the second one. By limiting the number of rules, abstraction and optimization of the data (imperfect recall) can result in new datasets being recalled.

Low Probability Transitions and Boundary Crossing into Disallowed States for a More Optimal Solution While the cellular automata approach discussed above with respect to step 110 allows imperfect recall, it does not improvise based on prior pattern experience in and of itself. Accordingly, an instance of a cellular automata array may be searched at 120 for alternative paths in patterns that were not previously considered (i.e., "pattern improv" or path jumping). This allows mapping of disallowed states and enables access to those states under certain conditions through a search algorithm. In other words, such embodiments are able to cross scenario boundaries by jumping from one scenario that is less desirable or even has no solution to another scenario that is more desirable. All possible outcomes may be mapped, and the algorithm may look for the most beneficial outcome regardless of probability, and then map the solution space to find the points of closest transition between the initial starting point and the desired endpoint. If a node of a current undesirable path and a node of an unlinked, but more favorable, path are sufficiently "close" based on sentiment and proximity, the algorithm may jump to the more favorable path in order to find a more optimal solution.

Windowed Cellular Automata to Create Plausible Alternatives

While steps 110 and 120 facilitate pattern recognition (instant improv) and alternative paths (pattern improv), respectively, these approaches do not generate completely new, plausible alternatives. Accordingly, some embodiments determine and create completely new, plausible nodes with features closer to more beneficial nodes at 130. This provides new, dynamic capabilities. Through the use of windowed memory learning, recall, and interpolation, new plausible structures are generated that predict dynamic systems.

Generally speaking, to create plausible new alternatives, some embodiments take state space, and perform PCA in order to generate relational sequences. A 6-number UID system based on DCT and a wavelet transform (WLT) may be used, for example, to determine the "closeness" of scenarios. Scenarios may be seeded with initial conditions, and the solution space may then be mapped.

Sequences (i.e., paths) that lead to positive outcomes may be saved in a positive outcome bin (positive sentiment), sequences that lead to negative outcomes may be saved in a negative outcome bin (negative sentiment), and sequences that lead to neutral outcomes may be saves in a neutral outcome bin (neutral sentiment). This may be a default for observation of phenomena in some embodiments in order to simulate natural phenomena. The scenarios may then be "replayed," points may be found where the structure is "weak" and can be jumped (e.g., relatively close, but not close enough for a jump without a new node), a new node can be created based on UIDs and sentiment of proximate nodes, and the algorithm may jump from one sequence to the new node and on to the other sequence.

Figure 2:
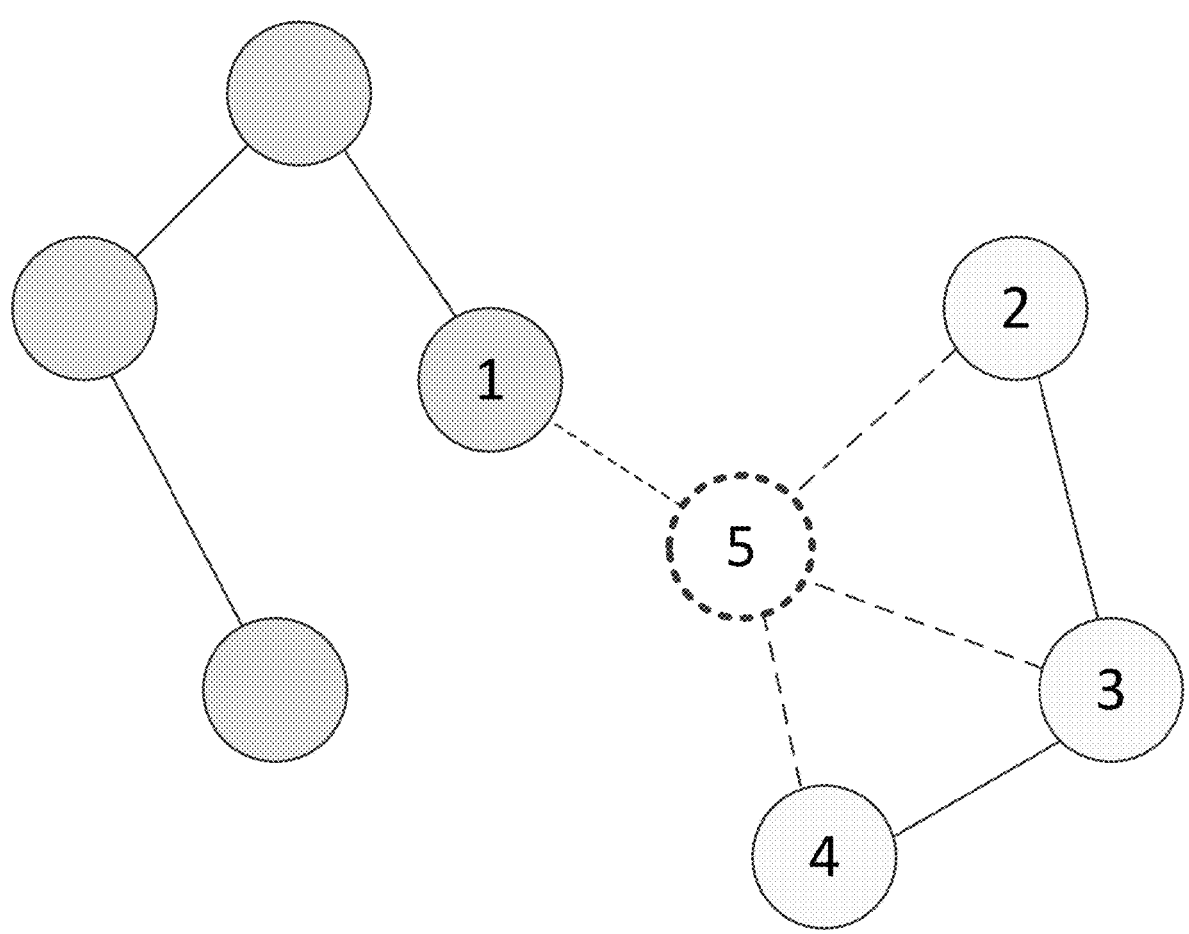
FIG. 2 illustrates an example of new node creation based on existing nodes, according to an embodiment of the present invention.

FIG. 2 illustrates an example 200 of new node creation based on existing nodes, according to an embodiment of the present invention. In FIG. 2, the darker gray and lighter gray nodes are on different paths, and the distance between the nodes of the different paths (such as between node 1 and 2, node 1 and 3, and node 1 and 4) is too far to jump from one path to another. The nodes are linked based on prior experience or from pattern improv. However, a new node can be created in this case that is "close enough" such that traversal from one path to another is possible. From UID and sentiment values for nodes 1, 2, 3, and 4, new node 5 is created. Based on the UIDs and sentiment, the position of the new node may be closer/further to/from certain nodes. In other words, new node 5 is not necessarily equidistant between nodes 1, 2, 3, and 4.

It should be noted that in this embodiment, after node 5 is created, the system would look to the most beneficial node to jump to. Assuming that nodes with negative sentiment are mapped on the left and nodes with positive sentiment are mapped on the right, the algorithm would most likely choose node 3 over nodes 2 or 4. This is because node 2 is going backwards in "time" and node 4 has less positive sentiment than node 3 in this example.

In some embodiments, multiple interpolated nodes may be created if the distances to be crossed are too great. However, multiple interpolated nodes may run the risk of crossing boundaries that are too difficult to traverse. As such, there should still be some distance that is too great to cross even with multiple interpolated nodes.

Various practical applications of such an algorithm are possible. Consider the problems of predicting road growth in a jungle for illegal logging. If law enforcement activity in an area is increased and/or an ecological vacation site is established that provides locals with economic opportunities, illegal logging activity in that area may decrease. It is thus expected that this activity will crop up in areas with weaker law enforcement activities and/or fewer economic opportunities.

Some embodiments may be applied to predict where illegal activity will appear again and where road formation will occur. Consider images 300 of FIG. 3, which are a progression of four Google Earth™ historical images illustrating deforestation in the Brazilian Amazon state of Rondonia between 1975 and 2009. The algorithm of some embodiments may be trained to learn underlying rules using such progressions as prior experience. The algorithm may then apply these rules to provide predictions in road growth and changes in behavior due to intervention. The algorithm may also predict the most likely areas for future illegal activities.

Based on this learning, memory array recall may be used to develop new ideas. In other words, cellular automata can be programmed to recognize a road development pattern and then provide projections into the future. Multiple road growth patterns may be incorporated, taking into account topology, resources, reasons for growth, and forking. Though a satellite image captures the net effect of these underlying variables, the more information about the underlying mechanics of road development that is incorporated into the dataset, the more information that is available for a data reduction algorithm like principle component analyses (PCAs) to find the most important variable combination, making this algorithm not limited to image information alone. For instance, resource rich areas may be simulated in a similar manner to crystal growth simulations.

Crystal growth, such as growth of geodes or sugar candy from a string, is a case in which the variables include resource concentration, the availability of an existing crystal facet to grow, and any barriers that would inhibit crystal growth. Mapping these variables and their behavior through time would provide the algorithm with the information necessary to emulate other more complex growth patterns, such as road development in rainforests. However, this is just one example, and any desired mechanism for mapping variables and their behavior through time that is suitable for a given problem may be used without deviating from the scope of the invention.

Figure 4:
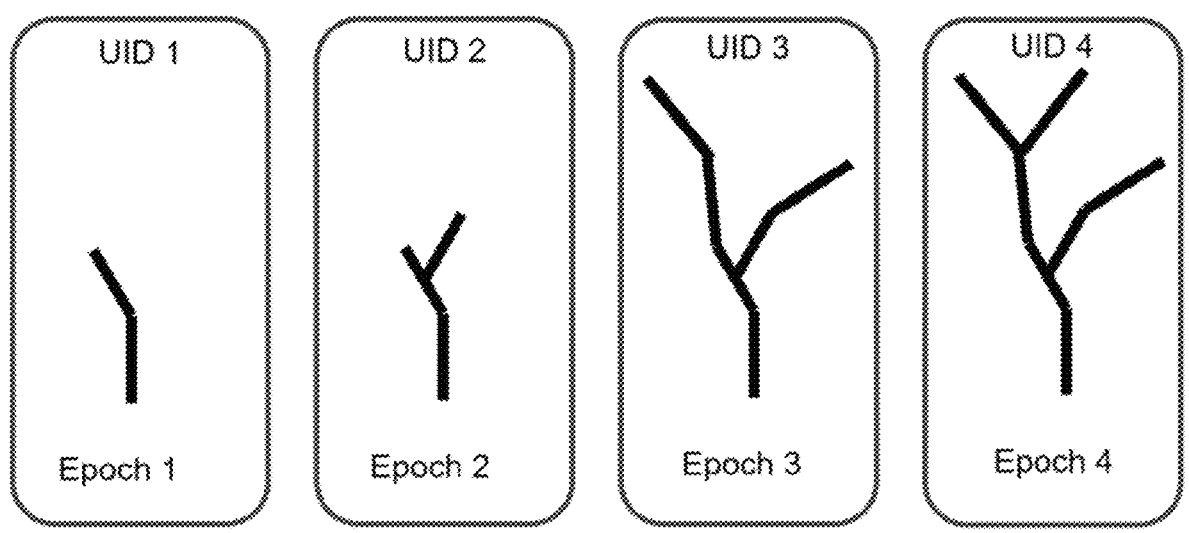
FIG. 4 is a progression of four unique IDs (UIDs) predicting road growth over four time epochs, according to an embodiment of the present invention.

Using a memory recall for images alone is shown in the progression of temporal UIDs 400 shown in FIG. 4. A new cellular automata array looks for node branches. Length and topology may be considered to determine where a new road will be made. However, this approach may be limited since growth must match the spatial array to enable pattern recall.

Figure 5:
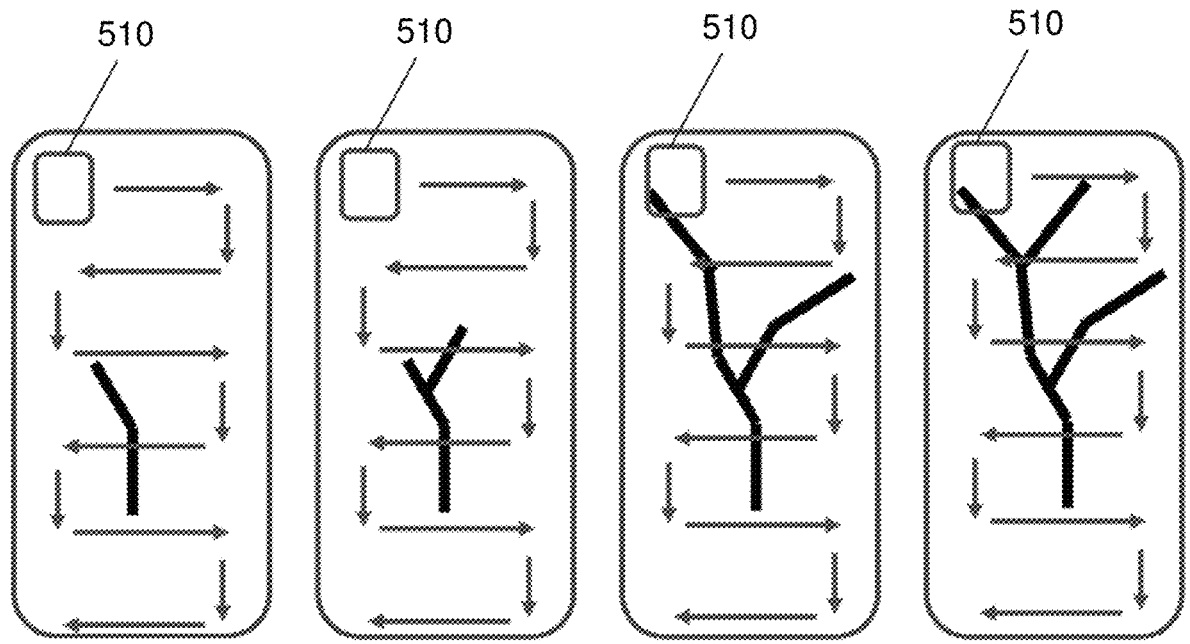
FIG. 5 is a progression of four UIDs upon which a moving window is used to train the algorithm for plausible next steps by learning multiple datasets, according to an embodiment of the present invention.

Accordingly, some embodiments use windowing to generalize a pattern and predict growth. FIG. 5 is a progression of four UIDs 500 upon which a moving window 510 is used to train the algorithm for plausible next steps by learning multiple datasets, according to an embodiment of the present invention. More specifically, a sliding window 510 of a predetermined size is moved across each UID image to learn its features. The size of the sliding window may be arbitrary in some embodiments. However, the window should be large enough to identify growth and branching points from the road/crystal/tree/etc., but small enough to detect these points on an individual basis. As such, the size should be relative to the scale of the datasets.

The algorithm employed in FIG. 5 may be as follows in some embodiments: (1) Take a reference dataset of growth, such as a high resolution image series of road growth as in FIG. 3; (2) Analyze image sets and determine the relative size of branching points and resource areas by taking the first image and overlaying resource areas (e.g., groves of valuable Ipê trees in Brazil, possible dam building locations, concentrations of wildlife, such as the blue-throated macaw, etc.) to the progression of the roads as a means to predict future road development, as well as identify blocks to road development (detractors) (e.g., large rivers, swamps, mountainous regions, etc.); (3) Create a cellular automata array that is sized in a manner that takes these variables into account; and (4) Pan and scan the cellular automata array over the time evolved dataset to train individual cellular automata to be sensitive to these variables. Step (4) may be accomplished by: (a) in the window, evolve the dataset in time (for instance, where cellular automata (CA) X with a road pixel sees that CA A is resource rich, and in the next time step, CA M, which is adjacent to X and in the direction of A, contains a road pixel, the array learns that the resource rich region attracts a road pixel in X from Y); (b) pan the array to the right one pixel and repeat step (a) (e.g., in the example above for step (a), this trains CA Y that now has the road pixel in CA X from the last iteration that CA B which has the resource rich pixel from CA A that CA N now has a road pixel); and (c) iterate across the entire dataset in this manner to train each CA pixel on the relative importance of each resource and detractor pixels.

Figure 6:
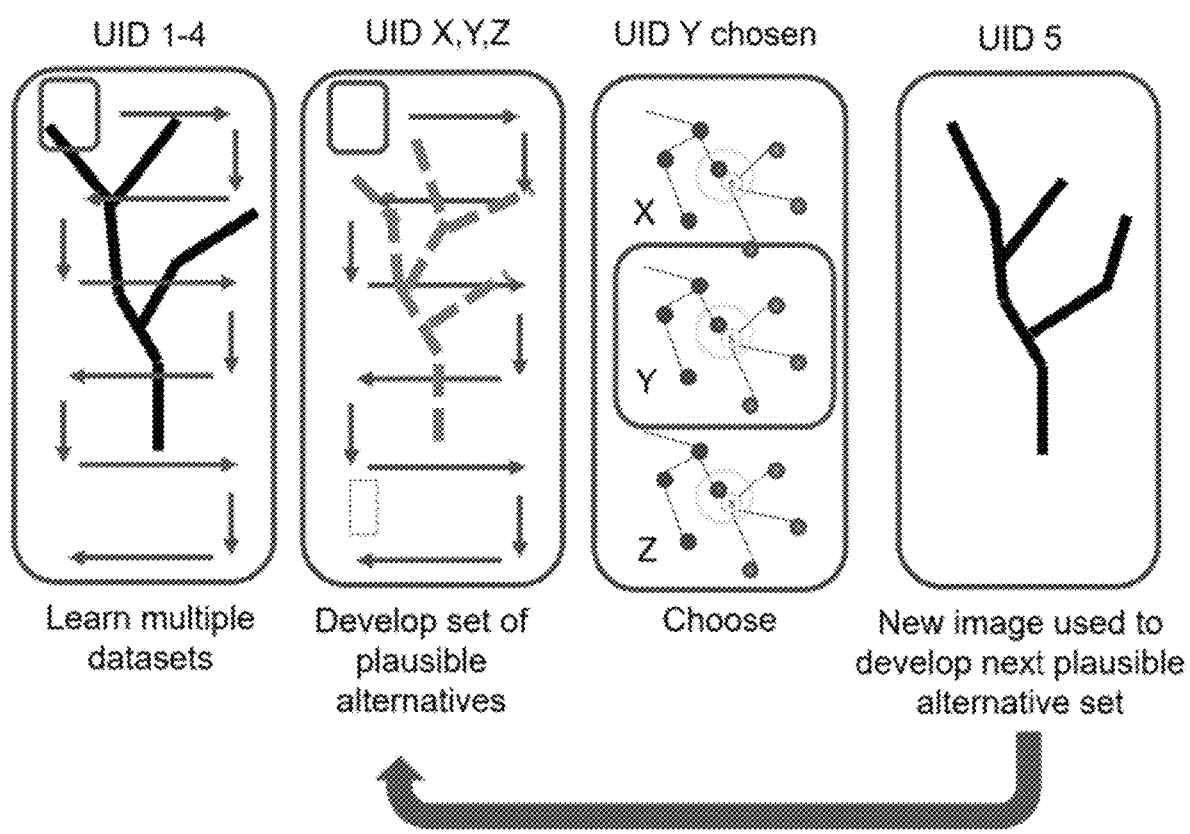
FIG. 6 illustrates a process for developing new alternatives, according to an embodiment of the present invention.

The sliding window analysis from FIG. 5 enables generation of new UIDs to predict future patterns, as is shown in process 600 of FIG. 6. Once multiple datasets have been learned from UIDs 1-4, a set of plausible alternatives X, Y, Z is developed. Once a CA array has been developed that is sensitive to both resource rich and detractor pixels, possible growth and branching points can be predicted. By taking a current image of the array and then utilizing the array to "dream," or predict future growth based on the learned dataset by panning and scanning in a manner similar to the training scenario described above, a predicted road for the next step will be generated. When run multiple times, it is expected in complex cases that multiple plausible road growth maps will be generated. These maps can then be subjected to the same UID process (WVLT and DCT transform, then PCA using the original dataset) to create multiple UID combinations, such as X, Y, or Z. In this example, UID Y is chosen since it is presumably the most favorable.

It should be noted that while the graphs depicted in FIG. 6 are shown to be identical, while multiple node 5's may be generated, this need not be the case. Some nodes will not be in line with reasonable predictions, while others will. The algorithm will then choose the most reasonable node given the prediction mapped in UID space.

In FIG. 6, a new image, UID 5, is generated from UID Y, which is then fed back into the process of plausible alternative determination to determine a new set of plausible alternatives. This process may be repeated any desired number of times without deviating from the scope of the invention. The overall process is to train a CA to detect and predict multiple possible future states. The resultant possible states are then compared by their UIDs and the most reasonable prediction is chosen.

An alternative approach to that shown in FIG. 6 is to use inverse PCA and inverse DCT, or inverse PCA and inverse WLT. Returning to FIG. 2, a new UID sequence (i.e., node 5) can be derived from the average of UIDs 1, 2, 3, and 4. Since the UID sequence is the PCA of the wavelet and cosine (real) Fourier transform, an inverse of the PCA would derive the original wavelet and cosine eigenvalues. An inverse of the eigenvalues would then recreate a possible image that would satisfy the conditions.

More specifically, DCT and WLT are performed on the images and PCA is performed on the resultant images from the DCT and the WLT. The three top principal components are then taken to create a 6-digit UID, for example. This UID is reversible, and you can perform the inverse of the PCA and the DCT/WLT to reconstruct the original image. In other words, the information can be compacted, and then uncompacted and reversed. This process is also faster than the windowing-based process discussed above with respect to FIG. 6.

Also of interest is the ability to start with a UID that has not actually been seen before and reverse it. This leads to melding of information between this artificially created node and another, actually existing node. The transforms chosen to create the UID are, in principle, completely reversible techniques in that no information is lost. The information can be stored in the underlying databases from which the component eigenvectors are extracted. This is in contrast to DLNNs, which by nature seek to reduce information down to specific point solutions by trading computational efficiency and accuracy with irreversibility.

PCA, on the other hand, takes the information provided and reorganizes the relationships between datasets though orthogonal vectors that can cross multiple variables. The number of vectors determines the fidelity of the compaction. In some embodiments, three principal components are utilized to describe the data from the WLT and three principal components are utilized to describe the data from the DCT.

By increasing the number of principal components, the level of fidelity is expected to increase at the cost of a larger UID. One unique aspect of such embodiments is that most of the time, the forward case of the PCA transform can be used to compactify the underlying variables and identify a new set of orthogonal variables that make the underlying dataset unique. PCA and related techniques are often used to find subtle variations in the dataset to help differentiate between systems. In these cases, such as the identification and mapping of chemical signatures from Time of Flight Secondary Ion Mass Spectroscopy, the underlying variables are previously identified molecules and there is no need to guess new molecules that do not exist in the underlying datasets. Therefore, most implementations of PCA are in the forward direction in order to isolate complex variables to discern and classify one signal versus another.

However, the PCA transform can be inverted and create proposed underlying variables based on the datasets, representing a nonobvious use of the reversibility of the transform properties. The interpolation of the underlying variables in such embodiments corresponds not to the image, but to the eigenvectors describing the image in both the WLT and the DCT. These eigenvectors can be then used by reversing either or both transforms to generate interpolated images that previously did not exist.

FIG. 7 shows an example 700 of the result of the PCA and DCT inverse transform using the first three numbers of the UIDs, and FIG. 8 shows an example 800 of the result of the PCA and WLT inverse transform using the last three numbers from the UIDs. Note that in both FIGS. 7 and 8, the reconstructed cloud patterns only show broad changes. This is due to only the first three principal components being used. If the length of the UID is increased to include, for instance, 10 principal components from the DCT and WLT transforms, higher fidelity clouds should be seen at the cost of having a 20 number UID.

However, in this application, care should be taken to structure the number of principal components to best generate intermediate images/datasets between known UID nodes. For example, 10 WLT and 10 DCT principal components resulting in a 20 number UID were found to be too granular for practical weather image interpolation in an embodiment, resulting in intermediate areas with no unique images. It was found that UIDs that utilized between 3 and 5 principal components are ideal in this embodiment.

Though the WLT and DCT transforms generate interpolated images, their emphasis on changes is different depending on their algorithms. WLT transforms are often good at edge detection and fine detail, while DCT transforms focus on repeatable patterns within an image. This results in different orthogonal components being selected by the PCA transform to create the 6-digit UID. As the number of orthogonal components describing the dataset increases, it is expected that the WLT and DCT transforms will converge in image fidelity.

It should be noted that in practical implementations, all of the images in FIGS. 7 and 8 may be in color. As such, embodiments are not limited to a grayscale reconstruction. In some embodiments, the datasets themselves may not be images, but rather, multidimensional variable datasets. Image analysis is used herein by way of nonlimiting example.

Use of PCA allows projection into the future not just for images, but also for projecting nonlinear ideas, such as Moore's Law for a very complex multivariate dataset that includes economic systems and relationships. The algorithm could be modified to provide benefits for both parties. Indeed, the algorithm may predict new opportunities and back-project to determine how to get there by plotting a large number of economic variables (e.g., 100).

As an example, by taking into account the economic variables of a set of major economies, such as the United States, Japan, and Europe, and plotting the economic progression based on variables such as age, demographics, education, gross domestic product (GDP), debt, etc., an algorithm can be developed that operates on these multivariate systems in a manner analogous to those discussed above operating on an image series of pixels, where the steps between the images are time. The algorithm may learn the various economic variables, and can predict how any new system (e.g., the Chinese economy) will progress given different variables. Through the predictive techniques disclosed herein, a desirable economic state with a known beneficial pattern can be projected, and intermediate states towards that goal can be interpolated given the initial state and the predicted progression. In the same vein as prediction of road development in the Amazon, the economic development can be predicted, and points in the future can be identified where the economy can pivot and follow a more traditional path of prosperity.

China and India are use cases as the initial starting conditions of the economies in the 1990s represented before modernization, and they work to skip over multiple stages of western economic development. These countries are currently attempting to transition into a position of leadership in the world. In this case, the algorithm would be able to predict the future state of the emerging Chinese economy and predict when the best point to transition from a jump-started economy to a more mainstream developed economy with predictable growth can occur. Furthermore, the algorithm may provide specific economic benchmarks as guides for the economies to progress towards this new path in the most cost effective and efficient manner possible, thus creating new alternatives and solving the "Fool's Choice" paradox with innovative solutions. The Fool's Choice involves false dilemmas that suggest only two options (both of them bad), when in fact there are additional undiscovered choices, with some of them good.

Figure 9A:
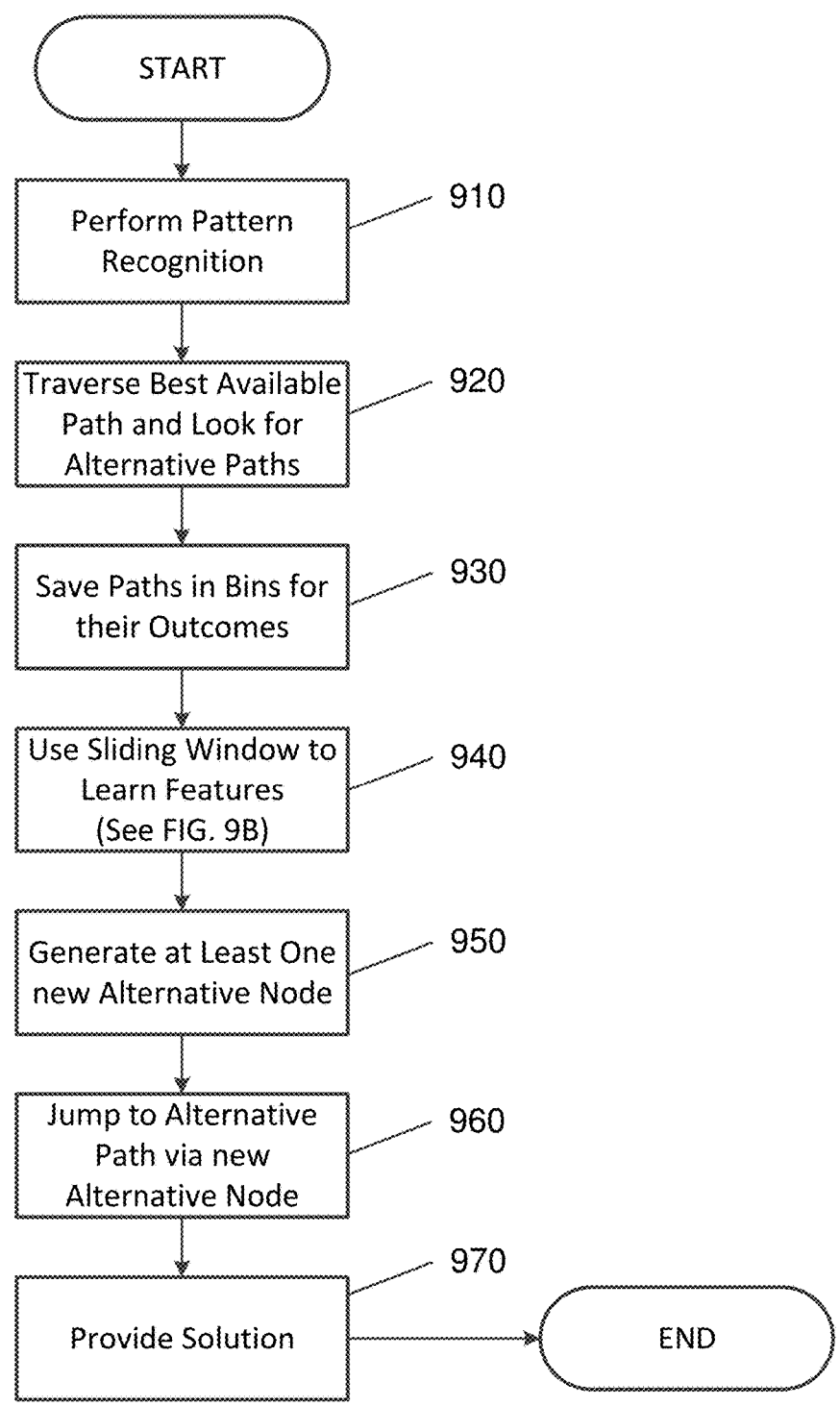
FIG. 9A is a flowchart illustrating a process for employing windowed cellular automata to create plausible alternatives, according to an embodiment of the present invention.

FIGS. 9A and 9B are flowcharts 900, 940 illustrating a process for employing windowed cellular automata to create plausible alternatives, according to an embodiment of the present invention. The process begins with performing pattern recognition at 910 to determine a best available path from a plurality of nodes representing choices. The plurality of nodes are encoded into a cellular automata array and include a UID. In some embodiments, each UID may be generated from a WLT and DCT that are used as feeds into PCA to create a unique hash of bins of numbers.

The best available path is then traversed and alternative paths are sought within a predetermined distance from a current UID that present alternative path choices at 920. The alternative path choices are not directly reachable via the best available path. In certain embodiments, the UID includes a sentiment value, and paths are saved in respective bins for positive outcomes, negative outcomes, and neutral outcomes at 930.

A sliding window is moved across each UID at 940 to learn its features. This process is shown in more detail in flowchart 940 of FIG. 9B. More specifically, a reference series of images is taken as a dataset at 941. The reference series of images is then analyzed at 942 to determine a relative size of branching points and resource areas by taking a first image of the reference series of images and overlaying the resource areas to a progression of branches to predict future patterns. Detractor areas are identified at 943, and the cellular automata array is created and sized to take the branching points, resource areas, and detractor areas into account. The cellular automata array is panned and scanned over a time evolved dataset at 945 to train individual cellular automata to be sensitive to the branching points, resource areas, and detractor areas. In some embodiments, the panning and scanning of the cellular automata array over the time evolved dataset includes, in the sliding window, evolving the dataset in time, panning the cellular automata array right one pixel and repeating the evolving of the dataset in time, and iterating across the entire dataset in this manner to train each cellular automaton pixel on a relative importance of each resource pixel and detractor pixel.

At least one new alternative node is generated at 950 that is closer to at least one more beneficial node of at least one of the alternative paths. In some embodiments, the at least one new alternative node is determined by taking state space and performing PCA in order to generate relational sequences, where UIDs of nodes are used to determine the distance therebetween. Steps 920 and 950 may be repeated in some embodiments. The system then jumps from the determined best path available to an alternative path at 960 via the generated at least one new alternative node, and a solution is provided at 970 by following the alternative path to which the program jumped to a conclusion of the alternative path.

In some embodiments, the UIDs are reversible. In certain embodiments, PCA and an inverse WLT, or inverse PCA and an inverse DCT, from an average of UIDs of nodes used to create the at least one new alternative node may be used to derive original wavelet or cosine eigenvalues. An image may then be recreated using an inverse of the eigenvalues, thereby melding information between the artificially created at least one new alternative node and at least one actually existing node.

Figure 10:
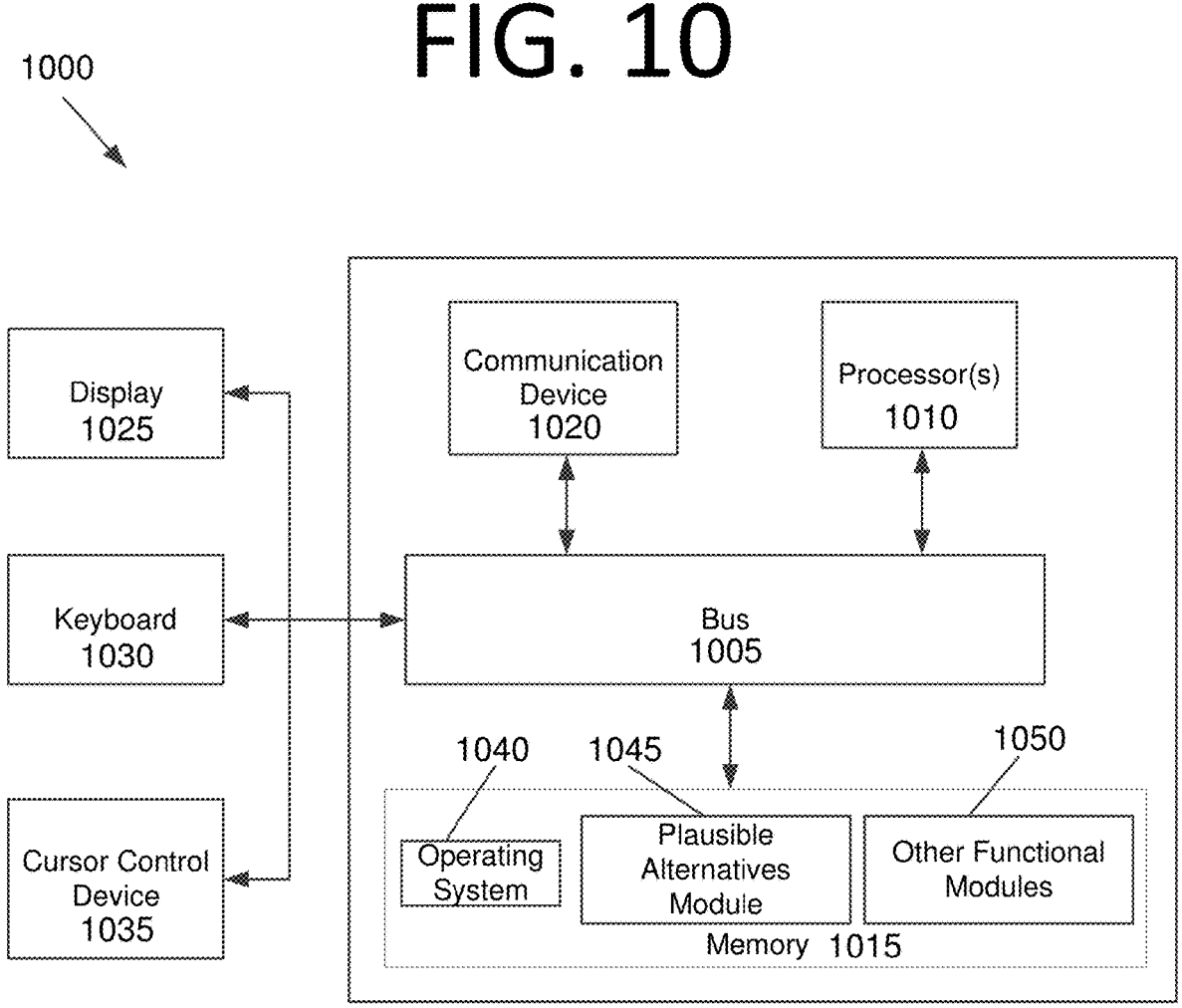
FIG. 10 illustrates a computing system configured to employ windowed cellular automata to create plausible alternatives, according to an embodiment of the present invention.

FIG. 10 illustrates a computing system 1000 configured to employ windowed cellular automata to create plausible alternatives, according to an embodiment of the present invention. System 1000 includes a bus 1005 or other communication mechanism for communicating information, and processor(s) 1010 coupled to bus 1005 for processing information. Processor(s) 1010 may be any type of general or specific purpose processor, including, but not limited to, a central processing unit (CPU) or application specific integrated circuit (ASIC). Processor(s) 1010 may also have multiple processing cores, and at least some of the cores may be configured for specific functions. System 1000 further includes a memory 1015 for storing information and instructions to be executed by processor(s) 1010. Memory 1015 can be comprised of any combination of random access memory (RAM), read only memory (ROM), flash memory, cache, static storage such as a magnetic or optical disk, or any other types of non-transitory computer-readable media or combinations thereof. Additionally, system 1000 includes a communication device 1020, such as a transceiver, to wirelessly provide access to a communications network.

Non-transitory computer-readable media may be any available media that can be accessed by processor(s) 1010 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1010 are further coupled via bus 1005 to a display 1025, such as a Liquid Crystal Display (LCD), for displaying information to a user. A keyboard 1030 and a cursor control device 1035, such as a computer mouse, are further coupled to bus 1005 to enable a user to interface with system 1000. However, in certain embodiments such as those for mobile computing implementations, a physical keyboard and mouse may not be present, and the user may interact with the device solely through display 1025 and/or a touchpad (not shown). Any type and combination of input devices may be used as a matter of design choice.

In one embodiment, memory 1015 stores software modules that provide functionality when executed by processor(s) 1010. The modules include an operating system 1040 for system 1000. The modules further include a plausible alternatives module 1045 that is configured to employ windowed cellular automata to create plausible alternatives in accordance with the various processes discussed herein. System 1000 may include one or more additional functional modules 1050 that include additional functionality.

One skilled in the art will appreciate that a "system" could be embodied as a personal computer, a server, a console, a personal digital assistant (PDA), a cell phone (e.g., a smart phone), a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 9A and 9B may be performed by a computer program, encoding instructions for the processor to perform at least the process described in FIGS. 9A and 9B, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the processor to implement the process described in FIGS. 9A and 9B, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general-purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program for analyzing a scenario embodied on a non-transitory computer-readable medium, the program configured to cause at least one processor to:
   perform pattern recognition to determine a best available path from a plurality of nodes representing choices, the plurality of nodes encoded into a cellular automata array and comprising a unique identifier (UID);
   traverse the best available path and look for alternative paths within a predetermined distance from a current UID that present alternative path choices, the alternative path choices not directly reachable via the best available path;
   generate at least one new alternative node that is closer to at least one more beneficial node of at least one of the alternative paths;
   jump from the determined best path available to an alternative path via the generated at least one new alternative node; and
   provide a solution by following the alternative path to which the program jumped to a conclusion of the alternative path, wherein
   each UID comprises numbers derived from a dimensional reduction technique that provides relational meaning between unique IDs.

2. The computer program of claim 1, wherein the steps of looking for alternative paths and generating at least one new alternative node are repeated using UIDs of the at least one new alternative node.

3. The computer program of claim 1, wherein each UID is generated from a wavelet transform (WLT) and a discrete cosine transform (DCT) that are used as feeds into a principal component analysis (PCA) to create a unique hash of bins of numbers.

4. The computer program of claim 3, wherein the UID comprises a sentiment value.

5. The computer program of claim 3, wherein the at least one new alternative node is determined by taking state space and performing PCA in order to generate relational sequences, where UIDs of nodes are used to determine the distance therebetween.

6. The computer program of claim 1, wherein the program is further configured to cause the at least one processor to:
   save paths that lead to a positive outcome in a positive outcome bin;
   save paths that lead to a negative outcome in a negative outcome bin; and
   save paths that lead to a neutral outcome in a neutral outcome bin.

7. The computer program of claim 1, wherein the program is further configured to cause the at least one processor to:
   move a sliding window across each UID to learn its features.

8. The computer program of claim 7, the program further configured to cause the at least one processor to:

take a reference series of images as a dataset;
analyze the reference series of images to determine a relative size of branching points and resource areas by taking a first image of the reference series of images and overlaying the resource areas to a progression of branches to predict future patterns;
identify detractor areas;
create the cellular automata array sized to take the branching points, resource areas, and detractor areas into account; and
pan and scan the cellular automata array over a time evolved dataset to train individual cellular automata to be sensitive to the branching points, resource areas, and detractor areas.

9. The computer program of claim 8, wherein the panning and scanning of the cellular automata array over the time evolved dataset comprises:
in the sliding window, evolving the dataset in time;
panning the cellular automata array right one pixel and repeating the evolving of the dataset in time; and
iterating across the entire dataset in this manner to train each cellular automaton pixel on a relative importance of each resource pixel and detractor pixel.

10. The computer program of claim 1, wherein the UIDs are reversible.

11. The computer program of claim 1, the program further configured to cause the at least one processor to:
use inverse principal component analysis (PCA) and an inverse wavelet transform (WLT), or inverse PCA and an inverse discrete cosine transform (DCT), from an average of UIDs of nodes used to create the at least one new alternative node to derive original wavelet or cosine eigenvalues; and
recreate an image using an inverse of the eigenvalues, thereby melding information between the artificially created at least one new alternative node and at least one actually existing node.

12. A computer-implemented method, comprising:
generating, by a computing system, a new alternative node, the new alternative node between a first node of a current path and a second node of an alternative path, the first node the second node having respective unique identifiers (UIDs), the first node and the second node proximate to one another within a predetermined distance based on the respective Ms;
saving paths that lead to a positive outcome in a positive outcome bin, by the computing system;
saving paths that lead to a negative outcome in a negative outcome bin, by the computing system; and
saving paths that lead to a neutral outcome in a neutral outcome bin, by the computing system;
jumping, by the computing system, from the first node to the second node via the generated new alternative node; and
providing a solution, by the computing system, by following the alternative path to which the program jumped to a conclusion of the alternative path.

13. The computer-implemented method of claim 12, further comprising:
performing pattern recognition, by the computing system, to determine the current path from a plurality of nodes representing choices, the plurality of nodes encoded into a cellular automata array and comprising UIDs; and
traversing the current path, by the computing system, and looking for alternative paths within a predetermined distance from a current UID that present alternative path choices, the alternative path choices not directly reachable via the current path.

14. The computer-implemented method of claim 13, wherein the steps of looking for alternative paths and generating the new alternative node are repeated using the UID of the new alternative node.

15. The computer-implemented method of claim 12, wherein each UID is generated from a wavelet transform (WLT) and a discrete cosine transform (DCT) that are used as feeds into a principal component analysis (PCA) to create a unique hash of bins of numbers.

16. The computer-implemented method of claim 15, wherein the UID comprises a sentiment value.

17. The computer-implemented method of claim 15, wherein the new alternative node is determined by taking state space and performing PCA in order to generate relational sequences, where UIDs of nodes are used to determine the distance therebetween.

18. The computer-implemented method of claim 12, further comprising:
saving paths that lead to a positive outcome in a positive outcome bin, by the computing system;
saving paths that lead to a negative outcome in a negative outcome bin, by the computing system; and
saving paths that lead to a neutral outcome in a neutral outcome bin, by the computing system.

19. The computer-implemented method of claim 12, further comprising:
moving a sliding window across each UID to learn its features, by the computing system.

20. The computer-implemented method of claim 19, further comprising:
taking a reference series of images as a dataset, by the computing system;
analyzing the reference series of images, by the computing system, to determine a relative size of branching points and resource areas by taking a first image of the reference series of images and overlaying the resource areas to a progression of branches to predict future patterns;
identifying detractor areas, by the computing system;
creating a cellular automata array sized to take the branching points, resource areas, and detractor areas into account, by the computing system; and
panning and scanning the cellular automata array over a time evolved dataset, by the computing system, to train individual cellular automata to be sensitive to the branching points, resource areas, and detractor areas.

21. The computer-implemented method of claim 20, wherein the panning and scanning of the cellular automata array over the time evolved dataset comprises:
in the sliding window, evolving the dataset in time;
panning the cellular automata array right one pixel and repeating the evolving of the dataset in time; and
iterating across the entire dataset in this manner to train each cellular automaton pixel on a relative importance of each resource pixel and detractor pixel.

22. The computer-implemented method of claim 12, wherein the UIDs are reversible.

23. The computer-implemented method of claim 12, further comprising:
using inverse principal component analysis (PCA) and an inverse wavelet transform (WLT), or inverse PCA and an inverse discrete cosine transform (DCT), by the computing system, from an average of UIDs of the first node and the second node used to create the new alternative node to derive original wavelet or cosine eigenvalues; and recreating an image, by the computing system, using an inverse of the eigenvalues, thereby melding information between the artificially created new alternative node, the first node, and the second node.

\* \* \* \* \*